US009488471B2

(12) United States Patent
Shulman et al.

(10) Patent No.: US 9,488,471 B2
(45) Date of Patent: Nov. 8, 2016

(54) METHODS AND SYSTEMS FOR NAVIGATION AND TERRAIN CHANGE DETECTION (75) Inventors: Alan Shulman, Santa Rosa, CA (US); Miles L. Scott, Rohnert Park, CA (US)

(73) Assignee: DOUBLESHOT, INC., Santa Clara, CA (US)

( * ) Notice: Subject to any disclaimer, the term of this patent is extended or adjusted under 35 U.S.C. 154(b) by 1036 days.

(21) Appl. No.: 12/265,684

(22) Filed: Nov. 5, 2008

(65) Prior Publication Data

US 2009/0115779 A1    May 7, 2009

Related U.S. Application Data (60) Provisional application No. 60/985,564, filed on Nov. 5, 2007.

(51) Int. Cl.
*G06T 13/00* (2011.01)
*G01B 11/25* (2006.01)
*G01C 11/06* (2006.01)
*G06T 19/00* (2011.01)
(Continued)

(52) U.S. Cl.
CPC ............ *G01B 11/2513* (2013.01); *G01C 11/06* (2013.01); *G06T 19/003* (2013.01); *G06T 7/2033* (2013.01); *G06T 13/00* (2013.01); *G06T 13/20* (2013.01); *G06T 13/40* (2013.01); *G06T 13/80* (2013.01)

(58) Field of Classification Search
CPC ....... G06T 13/00; G06T 13/20; G06T 13/80; G06T 7/2033; G06T 13/40
USPC ........ 345/419, 424, 475; 382/131, 128, 132, 382/154, 275; 356/2, 610, 397; 701/3, 7, 701/10, 16, 201, 209
See application file for complete search history.

(56) References Cited

U.S. PATENT DOCUMENTS 6,154,133 A * 11/2000 Ross et al. .................... 340/541
6,377,700 B1 * 4/2002 Mack et al. .................. 382/154
(Continued)

FOREIGN PATENT DOCUMENTS

EP    1 806 700 A1    7/2007

OTHER PUBLICATIONS

Chen et al., "Range data acquisition using color structured lighting and stereo vision," Image Vision Computing, 15(6): 445-456 (1997).

(Continued)

*Primary Examiner* — Abderrahim Merouan
(74) *Attorney, Agent, or Firm* — Finnegan, Henderson, Farabow, Garrett & Dunner LLP (57) ABSTRACT Methods and systems for performing navigation and terrain change detection based on real-time projection of a structured light pattern are provided. In a method for detecting a change in a field of view from a first point in time to a second point in time, a current three-dimensional dataset of the field of view is generated from a point of reference based on data received in real-time. The location of the point of reference is determined based on geo-spatial data. A stored three-dimensional dataset of the field of view generated from data received at the point of reference at the first point in time is accessed; and used to provide one or more alerts which signify changes in the field of view between the current three-dimensional dataset and the stored three-dimensional dataset.

15 Claims, 5 Drawing Sheets (51) Int. Cl.
  *G06T 13/40* (2011.01)
  *G06T 13/20* (2011.01)
  *G06T 7/20* (2006.01)
  *G06T 13/80* (2011.01)

(56) References Cited

U.S. PATENT DOCUMENTS

| | | | |
|---|---|---|---|
| 7,468,933 B2* | 12/2008 | Sugiura | B60R 21/013 340/436 |
| 7,724,379 B2* | 5/2010 | Kawasaki et al. | 356/603 |
| 2003/0081812 A1 | 5/2003 | Yamamoto et al. | |
| 2003/0158786 A1* | 8/2003 | Yaron | G06Q 30/02 705/14.41 |
| 2004/0005092 A1* | 1/2004 | Tomasi | 382/154 |
| 2004/0225425 A1* | 11/2004 | Kindo et al. | 701/36 |
| 2004/0252727 A1* | 12/2004 | Mousseau et al. | 370/503 |
| 2004/0257440 A1* | 12/2004 | Kondo et al. | 348/94 |
| 2005/0011275 A1* | 1/2005 | Ferguson et al. | 73/818 |
| 2005/0090028 A1* | 4/2005 | Stoute et al. | 438/29 |
| 2005/0091218 A1* | 4/2005 | Janes et al. | 707/10 |
| 2005/0201590 A1* | 9/2005 | Kudo | 382/103 |
| 2005/0231339 A1* | 10/2005 | Kudo | B60R 1/00 340/435 |
| 2006/0142942 A1* | 6/2006 | Pyo | 701/211 |
| 2007/0061076 A1* | 3/2007 | Shulman | 701/213 |
| 2007/0091172 A1* | 4/2007 | Lee | 348/113 |
| 2007/0155406 A1* | 7/2007 | Dowling et al. | 455/456.1 |
| 2007/0198181 A1* | 8/2007 | Shimamura | 701/211 |
| 2007/0204014 A1* | 8/2007 | Greer et al. | 709/219 |
| 2007/0210938 A1* | 9/2007 | Deurwaarder et al. | 340/995.21 |
| 2007/0219654 A1* | 9/2007 | Frink et al. | 700/91 |
| 2007/0225902 A1* | 9/2007 | Gretton et al. | 701/202 |
| 2008/0140271 A1* | 6/2008 | Garceau et al. | 701/10 |
| 2008/0154447 A1* | 6/2008 | Spinelli | 701/7 |
| 2009/0326820 A1* | 12/2009 | Shimizu | 701/301 |

OTHER PUBLICATIONS

Jung, "Detecting building changes from multitemporal aerial stereopairs" ISPRS Journal Photogrammetry Remote Sensing, 58: 187-201 (2004).

Maas, "Robust Automatic Surface Reconstruction with Structured Light," International Archives Photogrammetry Remote Sensing, XXIX: 709-713 (1992).

Invitation to Pay Additional Fees and, where Applicable, Protest Fee and Communication Relating to the Results of the Partial International Search, mailed Apr. 28, 2009, for International Application No. PCT/US2008/012505, filed Nov. 5, 2008 (9 pages).

PCT International Search Report and the Written Opinion mailed Aug. 17, 2009, in related International Application No. PCT/US2008/012505 (21 pages).

\* cited by examiner

METHODS AND SYSTEMS FOR NAVIGATION AND TERRAIN CHANGE DETECTION

CROSS-REFERENCE TO RELATED APPLICATIONS

The present application claims the benefit of priority of U.S. Provisional Application No. 60/985,564, filed Nov. 5, 2007, entitled "Methods and Systems for Navigation and Reconnaissance Based on Realtime Generation of Dot Projection," the disclosure of which is expressly incorporated herein by reference in its entirety.

BACKGROUND

1. Technical Field

Embodiments consistent with the presently-claimed invention are related generally to navigation systems and surface measurement systems and, in particular, to methods and systems for performing navigation and terrain change detection based on real-time projection of a structured light pattern.

2. Discussion of Related Art

Automated vehicle navigation systems have become increasingly popular due, in part, to satellite navigation technologies like Global Positioning Systems (GPS). In some applications, satellite navigation systems, like GPS, may be combined or used in conjunction with surface measurement systems to detect environmental changes associated with a current travel route. Traditional surface measurement systems and methods may depend on the comparison of visual data (pictures) to identify changes in a visual landscape in order to identify potential obstacles. When an obstacle is identified, a vehicle operator may take steps to change the current travel route, deploy countermeasures, or take other actions to neutralize the potential impact of the obstacle. The accuracy of visual data, however, is easily compromised by such things as shadows, time of day, weather, and camera/lens inconsistencies. Therefore, comparisons of visual data is highly prone to misinterpretation (false positives and missed positives) that may be caused by inconsistencies in the visual data, rather than a change in the visual landscape.

Further, in some environments, the satellite navigation system used in conjunction with the surface measurement system may also suffer from misinterpretation or disruptions. For example, navigating a vehicle through a congested urban environment using GPS may be impractical due to restricted lines of sight to satellites. In other cases, unintentional disruptions in GPS service or a denial of GPS service may be caused by interference from electronic equipment, such as television broadcast transmitters or mobile phones. In some cases, however, denial of GPS service may be caused intentionally using jamming devices designed to interfere with the reliable reception of GPS transmission signals received by a GPS receiver. In some cases, visual data generated by a surface measurement system may be used to aid navigation during a disruption or a denial of GPS service. Yet, as previously mentioned, visual data generated by a surface measurement system may be corrupted by shadows, time of day, weather, or camera/lens inconsistencies. Consequently, visual data is often less accurate than the location information provided by a GPS service.

Thus, vehicle navigation systems, such as GPS, used in conjunction with surface measurement systems may have limited effectiveness in providing reliable navigation and an inconsistent ability to identify environmental changes to the landscape surrounding the traveling vehicle in some instances.

SUMMARY

Methods and systems for performing navigation and terrain change detection based on real-time projection of a structured light pattern are provided. In a method for detecting a change in a field of view from a first point in time to a second point in time, a current three-dimensional dataset of the field of view is generated from a point of reference based on data received in real-time. The location of the point of reference is determined based on geo-spatial data. A stored three-dimensional dataset of the field of view is accessed, wherein the stored three-dimensional dataset of the field of view is generated from data previously captured at the point of reference; and one or more alerts are provided which signify changes in the field of view between the current three-dimensional dataset and the stored three-dimensional dataset. A system is also provided comprising a pattern projector configured to project a structured light pattern from a point of reference over a field of view originating from the point of reference; an imaging device configured to capture stereo imagery of the field of view from the point of reference; and a processor adapted to generate a three-dimensional dataset in real-time of the field of view based on the stereo imagery and a projection of the structured light pattern onto the field of view.

It is to be understood that both the foregoing general description and the following detailed description are exemplary and explanatory only and are not restrictive of the disclosed embodiments. Further the embodiments are described with reference to the accompanying drawings, which are incorporated in and constitute a part of this specification.

DETAILED DESCRIPTION

Reference will now be made in detail to the embodiments, examples of which are illustrated in the accompanying drawings. Wherever possible, the same reference numbers will be used throughout the drawings to refer to the same or like parts.

Figure 1:
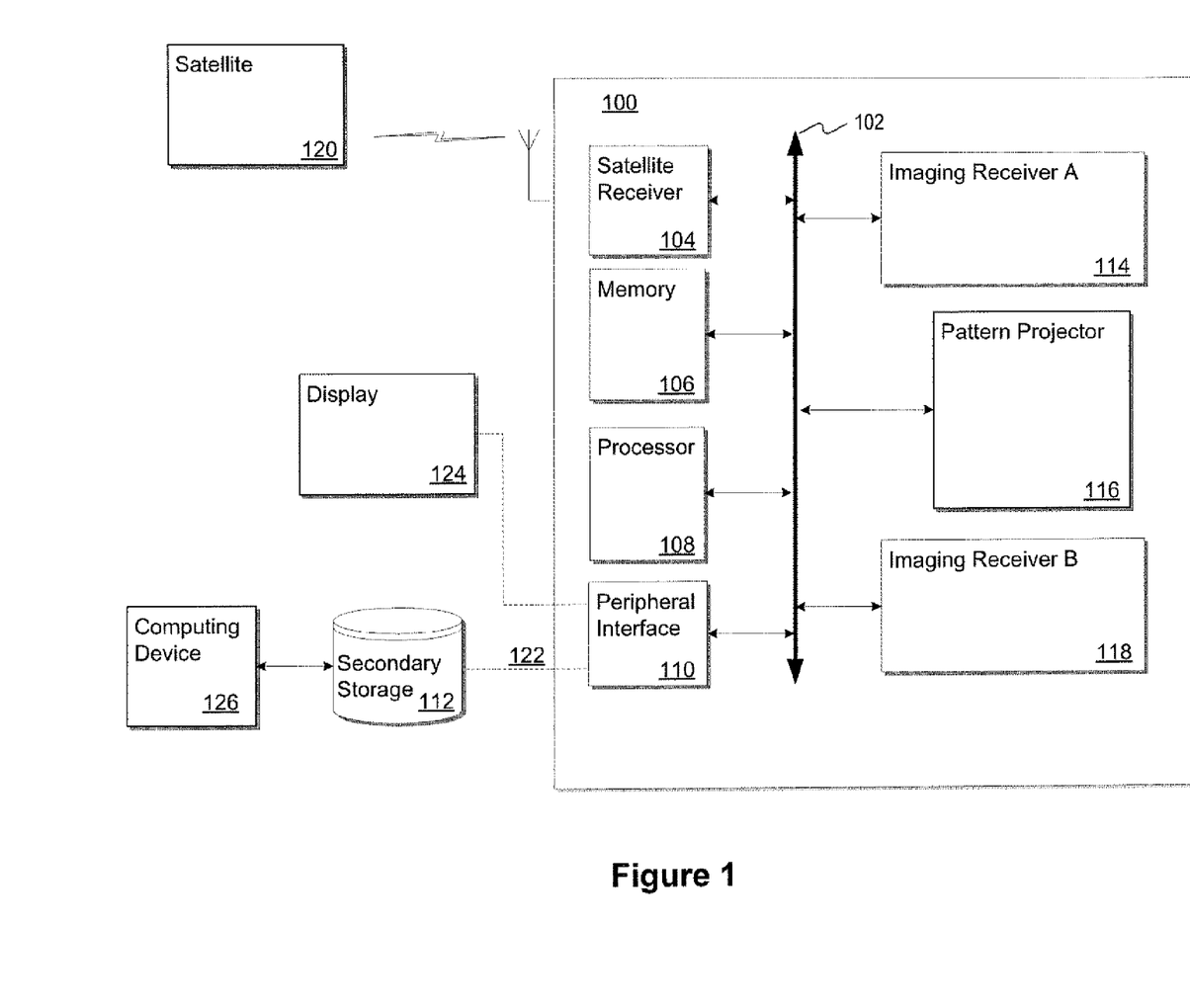
FIG. 1 shows a block diagram illustrating an exemplary system for providing navigation and terrain change detection based on real-time projection of a structured light pattern.

FIG. 1 shows a block diagram illustrating components in exemplary system 100 for providing navigation and terrain change detection within a field of view based on real-time projection of a structured light pattern. As shown in FIG. 1, system 100 may include bus 102 that couples satellite receiver 104, memory 106, processor 108, peripheral interface 110, imaging receiver A 114, pattern projector 116, and imaging receiver B 118. Exemplary system 100 may also be able to access secondary storage 112 using connection 122 and peripheral interface 110. In some embodiments, system 100 may be able to access satellite 120 using satellite receiver 104.

Exemplary satellite receiver 104 may be a device or functional module capable of receiving signals from satellite 120, which may be used to determine the location of satellite receiver 104. Satellite receiver 104 may be implemented in hardware, software, firmware, or a combination thereof.

Exemplary memory 106 may be one or more memory devices that store data as well as code. Code may include program modules which, when executed by processor 108, perform one or more processes to identify changes to terrain in a field of view or to determine a location point of reference. The term "point of reference" will be used generically to mean the point from which the field of view is being viewed, either by a person or a device. Memory 106 may include one or more of volatile or non-volatile semiconductor memories, magnetic storage, or optical storage, or similar device. In some embodiments, memory 106 may be a portable computer-readable storage media, such as a memory card, including, for example Compact Flash cards (CF cards), Secure Digital cards (SD cards), Multi-Media cards (MMC cards), or Memory Stick cards (MS cards). Portable memory devices may be equipped with a connector plug such as, a Universal Serial Bus (USB) connector or a FireWire® connector for uploading or downloading data and/or media between memory 106 and computing device 126 or other devices. Portable memory devices may also communicate with other devices via wireless communication methods.

System 100 may further include peripheral interface 110. In some embodiments, peripheral interface 110 may include external interface ports, such as USB, Ethernet, FireWire® and wireless communication protocols. System 100 may be operatively connected to a network (not shown) via a wired and/or wireless communications link using peripheral interface 110.

System 100 may include or utilize secondary storage 112 for storing data or program modules accessible by processor 108. Connection 122 couples secondary storage 112 and system 100 using peripheral interface 110, and may be implemented as a wired or wireless connection using conventional communication protocols and/or data port interfaces. In general, connection 122 can be any communication channel that allows transmission of information between the devices.

Secondary storage 112 may be one or more memory devices that store data as well as software. In some embodiments, the data may be stored on secondary storage 112 as complementary pairs of stereographic images of a particular field of view. For example, a field of view associated with a point of reference may be stored as complementary left and right image perspectives acquired using two cameras placed at different locations, or a single camera acquiring two image perspectives at two different locations. Stored images may also include reference data points of the projected structured light pattern within each complementary image perspective.

Alternatively or additionally, image data may be processed by processor 108 or computing device 126 and stored on secondary storage 112 as one or more three-dimensional or multi-dimensional datasets representing the captured image. In some embodiments, a three-dimensional dataset may be formatted as a point cloud or depth map, a wire grid, or other like format. The three-dimensional dataset may be derived based on range information deduced from the corresponding stereo images. In some embodiments, range information may be calculated using a processor executing code that performs triangulation or other algorithms used to determine range data from one or more captured images.

Exemplary processor 108 may be, for example, a general-purpose processor, an application specific processor, or an embedded processor. Processor 108 can exchange data including control information and instructions with other software modules or devices coupled to communicate using bus 102. Instructions may be code that when executed perform navigation and terrain change detection within a field of view based on real-time projection of a structured light pattern. For example, code may include real-time software algorithms to generate a single or a multi-dimensional data set of a field of view based on stereo imagery acquired by imaging receiver A 114 or imaging receiver B 118. In some embodiments, code may also include instructions for improving correspondence between a pair complementary stereo images using the structured light pattern captured along with the corresponding stereo images.

In some embodiments, the single or multi-dimensional dataset may be comprised of an array of spatially-registered volumetric pixels or voxels. In some embodiments, the array may be a two-dimensional array or a one-dimensional array depending on the type of structured light pattern used to process the dataset. In some embodiments, processor 108 may execute code to produce a one-dimensional array of spatially-registered voxels based on in part using a one-dimensional structured light pattern, such as a dot or line consisting of multiple dots. The code, for example, may perform triangulation to determine range data using the positional relationship between one or a combination imaging devices and a projector. The resulting dataset may consist of a multi-dimensional cross sectional profile of the surface illuminated by the one-dimensional structured light pattern. Similarly, processor 108 may execute code to produce a multi-dimensional array of spatially-registered voxels based on in part using a multi-dimensional structured light pattern, such as a dot array or multiple orthogonally intersecting lines. Processor 108 may execute code to determine rage data using triangulation techniques based on the positional relationship of the one or more imaging devices and the projector. In some embodiments, triangulation techniques may also utilize the projected structure light pattern and imagery of the projected structured light pattern on the field of view to determine range data in situations where the coherence between captured stereo image pairs may not be ideal. The two-dimensional array of spatially-registered voxels may then be used by processor 108 to produce a three-dimensional model of a surface captured by imaging devices 114 and 118 and covered by the multi-dimensional structured light pattern. Further, the code executed by processor 108 may also include instructions operable to cause processor 108 to collect intensity data associated with each point in the captured image used to produce each voxel.

When displayed, the array of spatially-registered voxels may provide a three-dimensional model of previously captured data that may be viewed from any direction. For example, array of spatially-registered voxels may include previously captured data corresponding to a landmark, a geographic feature, or geographic region, such as a highway, rural road, or an urban center. Each voxel may represent an individual point in the three-dimensional dataset. The relative position or local coordinates of each voxel within a particular array may be defined based on its position to the other voxels within the particular array. A particular voxel may be stored along with data specific to the particular voxel to create an enhanced voxel. Data, for example, may include intensity data, describing the reflective and/or transmissive energy for the wavelength range over which the underlying data point was collected. Data may also include geo-spatial data that associates the local coordinates of a particular voxel with an external coordinate system defining the area in which the voxel was collected. Geo-spatial data, for example, may include azimuth and elevation, latitude and longitude, street address, or other coordinate systems used to define a particular area. Accordingly, each enhanced voxel or spatially-registered array of enhanced voxels representing a particular stored three-dimensional field of view or multi-dimensional object within a the field may be accessed based on geo-spatial data. For example, a three-dimensional model of particular feature along a particular road may be accessed from a database by querying a database based on one or a combination of the latitude and longitude or azimuth and elevation associated with that feature.

Figure 2:
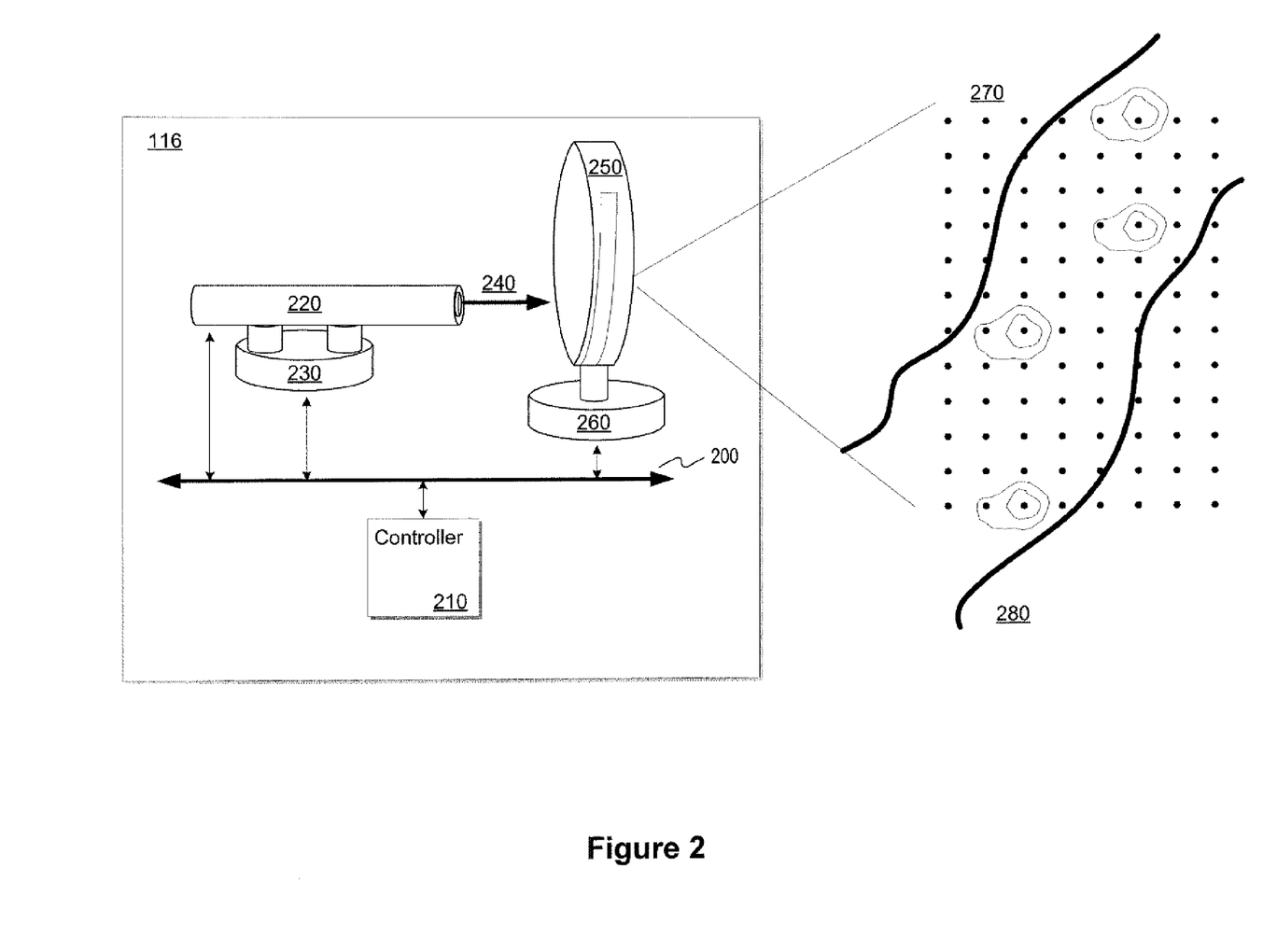
FIG. 2 shows a block diagram illustrating an exemplary pattern projector for creating a structured light pattern.

Exemplary pattern projector 116 may be a device or module capable of projecting a pre-defined structured light pattern onto a field of view. In some embodiments, the structured light pattern may be a grid of evenly spaced dots, as shown in FIG. 2, projected on the area around the point of reference using wavelengths in the visible or non-visible spectrum. The point of reference may be the location of an unmanned device or a manned device. The manned device may be, for example, a human-operated or handheld device. The unmanned device may be capable of automatic operation or remote human operation.

A device may be stationary or mobile. For example, such a device may be mounted to a rooftop or mounted in places where security cameras are typically mounted. In some embodiments, the device may be mounted on a mobile unit, such as a law enforcement vehicle or remotely operated surveillance vehicle. Pattern projector 116 may be implemented as self-contained module or as a combination of hardware, software, or firmware modules, including both active and passive optical devices as illustrated in FIG. 2. Pattern projector 116 may be coupled to communicate with memory 106 and processor 108 to receive instructions or data to generate a particular structured light pattern.

Exemplary imaging receiver A 114 and imaging receiver B 118 may be devices capable of acquiring imagery of the field of view and the structured light pattern projected onto the field of view. Generally, imaging receiver A 114 and imaging receiver B 118 may be devices having a focal plane array comprised of charged-coupled devices (CCDs), complementary metal oxide semiconductor (CMOS) image sensors, or similar image sensing technologies. In low light applications, imaging receiver A 114 and imaging receiver B 118 may be devices having a focal plane array comprised electron multiplying charged-coupled devices (EMCCDs), intensified charged-coupled devices (ICCDs), electron bombardment charged-coupled devices (EBCCDs), or other imaging technologies adapted for low-light image capture. In some embodiments, imaging sensors operating at any wavelength may be used to collect the stereographic pairs that are processed into range data. Further, other range finding techniques may be used to develop a three-dimensional random access geo-referenced database of structures or terrain, which may be stored in secondary storage 112.

In some embodiments, imaging receiver A 114 and imaging receiver B 118 may be instrumentation-grade digital video cameras, or like devices capable of receiving an image, digitizing the image, and outputting the image in a format capable of being acted on by processor 108 or stored by memory 106 or secondary storage 112. Imaging receiver A 114 and imaging receiver B 118 may be configured to acquire images based on commands received from processor 108 and or pattern projector 116. In some embodiments, images may be acquired at video or near video frequency, which may be, but is not limited to, a range 2 to 20 frames per second. In other embodiments imaging receiver A 114 and imaging receiver B 118 may capture images at rates greater than 20 frames per second. For example, embodiments utilizing EMCCD technology may capture video frames at 60 frames per second.

In some embodiments, imaging receiver A 114 and imaging receiver B 118 may be located at two known positions to generate a stereo image. The distance between imaging receiver A 114 and imaging receiver B 118 is typically fixed and generally referred to as the baseline. The baseline may be directly related to the distance of an object normal to the image plane created by imaging receiver A 114 and imaging receiver B 118. The distance of an object normal to the image plane may be used by processor 108 to calculate depth to produce a three-dimensional dataset of the corresponding field of view.

In some embodiments, the three-dimensional dataset may be formatted as a "point cloud," which may define the boundaries of the surfaces of all objects within the field of view. A point cloud may be a set of vertices in a three-dimensional coordinate system defined by x, y, and z coordinates. A point cloud may be used to generate other three-dimensional representations of the field of view, such as a wire grid. A wire grid may include a number of vertices in a three-dimensional space specified with reference to a coordinate system. The points in the three-dimensional space may be joined by lines to create sets of linked or related polygons or triangles that describe the edges of an object or field of view as a transparent drawing.

Exemplary display 124, may be a display device capable of displaying three-dimensional imagery. For example, display 124 may be a liquid crystal display (LCD), a cathode ray tube (CRT), a plasma display, or the like. In certain embodiments, display 124 may be a stereoscopic display. Stereoscopic displays may use any one of several methods to generate a three-dimensional image by presenting a viewer with different perspectives of a common field of view. Alternatively or additionally, display 124 may also be a touch screen configured to communicate with processor 108, secondary storage 112, or computing device 126 using peripheral interface 110. Further, display 124 may be capable of providing a notification or an alert based on the displayed data. An alert or notification may include at least one of a visual indicator, an audible indicator, and an electronic message.

Computing device 126 may be any type of device for communicating with system 100 using secondary storage 112 or using peripheral interface 110. For example, computing device 126 may be a personal computer, mobile communication device, or any other appropriate computing platform or device capable of exchanging data with system 100. Computing device 126 may include a processor (not shown) and a memory (not shown). Furthermore, computing device 126 may execute program modules that provide one or more graphical user interfaces (GUIs) for interacting with secondary storage 112 or system 100.

FIG. 2 shows a block diagram illustrating an exemplary pattern projector 116 for creating a structured light pattern. As shown in FIG. 2, pattern projector 116 includes bus 200 that couples light source 220, laser mount 230, diffractive optic element 250, optical mount 260, and controller 210. In other embodiments, pattern projector 116 may be a device utilizing a non-coherent light source (not shown) used in combination with the same, similar, or different components as illustrated in FIG. 2. Pattern projector 116 may be coupled to receive commands or data from processor 108 or imaging devices 114 and 118. For example, data may include a particular data series used to generate a particular structured light pattern output by diffractive optic element 250. In turn, processor 108 may be configured to process the structured light pattern in the stereo imagery captured by imaging receivers 114 and 118 to resolve stereo alignment, or correspondence issues and triangulation faults.

Diffractive optic element 250 may be a passive optical element having a surface consisting of complex microstructures forming a surface relief profile. In some embodiments, diffractive optic element 250 may be formed from a polymer substrate, such as polyimide or typical optical materials such as fused silica, germanium, or glass. The diffractive optic element 250 may be configured as a transmissive or reflective element. The surface relief profile may be created using various techniques including, but not limited to, lithography, direct machining, and replication. In some cases, a particular fabrication technique may be used based on the geometry and complexity of the microstructures required to produce a particular relief pattern. For example, lithographic techniques similar to those used in semiconductor manufacturing may be used to create very complex multiple-layer microstructures.

Diffractive optic element 250 may be comprised of multiple components, including lenses, diffraction gratings and other optics, which together act as a diffractive optic system, even though referred to herein as an "element." In some embodiments, a non-diffractive optic element (not shown) may be used in combination with diffractive optic element 250 to produce a desired structured light pattern. For example, a non-diffractive optic element, such as a Fresnel optic element, a traditional ground optic element, or a cast optic element, may be used to create a line in response to receiving an optical signal. Diffractive optical element 250 may be coupled to receive the resulting line output from the non-diffractive optic element to repeat the line, or other received structured element, forming a structured light pattern.

Diffractive optic element 250 may be an active optical element. This element may be a liquid crystal, DLP™, or Liquid Crystal on Silicon (LCOS) micro-display panel configured as a spatial light modulator. An active optical element may be driven by a computer, a processor or microcontroller, such as controller 210, or play back of pre-calculated data series stored in memory, such as memory 106. In response to receiving the data series, the active optic element may create a structured light pattern that varies based on the received data series. For example, in some cases, the process of using an active optical element to create a structured light pattern may be similar to the process used to send electronic data to a desk top projector. The difference, however, being that the pattern on the micro-display panel is a diffractive pattern where pixels have a phase shift component rather than a gray scale value. An active diffractive optic element may be either reflective or transmissive.

In certain embodiments, light source 220 may be mounted on laser mount 230 with diffractive optic element 250 mounted to the light source 220 so that both devices move together. Laser mount 230 and optical mount 260 enable light source 220 and diffractive optic element 250 to be moved and repositioned along multiple axes. In certain embodiments, diffractive optic element 250 may be mounted on an optical mount 260. Laser mount 230 and optical mount 260 allow light source 220 and diffractive optic element 250 to be moved and repositioned independently along multiple axes. Laser mount 230 and/or optical mount 260 may be, for example, one or a combination of, actuators, optical mounts, gimbals, or similar devices. The operation of laser mount 230 and optical mount 260 may be controlled by one or a combination of software, firmware, or hardware, such as controller 210.

Controller 210 may be a microcontroller, processor, application specific integrated circuit (ASIC), field programmable gate array, or like computational device capable of executing code to control operation of light source 220, laser mount 230, optical mount 260, and diffractive optic element 250. For example, controller 210, may execute code to control operating parameters laser mount 230 and optical mount 260 such as, speed of adjustment, resolution of movement, and pivot point.

Light source 220 may be, for example, a laser or a partially coherent light source. Lasers may be, for example, a laser diode, a solid state laser, or a gas laser. In certain embodiments, light source 220 may be a green diode-pumped solid state (DPSS) laser. DPSS lasers may operate in a time sequential, continuous wave (CW), quasi-CW, or pulsed mode. Alternatively, light source 220 may be a partially coherent light source, such as a light emitting diode (LED), or a non-coherent light source. Light source 220 may be positioned to project optical signal 240 toward diffractive optic element 250. In turn, diffractive optic element 250 may be positioned to receive optical signal 240 from light source 220, and to transform optical signal 240 into structured light pattern 270. In some embodiments, light source 220 may have a variable output power, such that the light source may be made brighter or dimmer, manually or automatically using controller 210. For example, light source 220 may be made brighter or stronger if system 100 is farther away from field of view 280, or dimmer if system 100 is closer. In some embodiments, light source 220 may be adjusted automatically in response to conditions perceived by system 100. For example, system 100 may include a detector (not shown) coupled to communicate with controller 210 that detects the level of ambient light, or whether it is night or day, or whether there is precipitation, or the amount of optical signal 240 return energy. The detector may provide information to controller 210 and/or processor 108 to adjust the system selectable output power.

As shown in FIG. 2, structured light pattern 270 may be comprised of a dot, a single line comprised of multiple dots, a dot-array, a series of lines, or multiple orthogonally intersecting lines. The spacing of the lines may be changed depending on various factors, such as the surface relief profile of diffractive optic element 250. The lines may be parallel or arranged in some other fashion. Other exemplary patterns are also possible.

Figure 3:
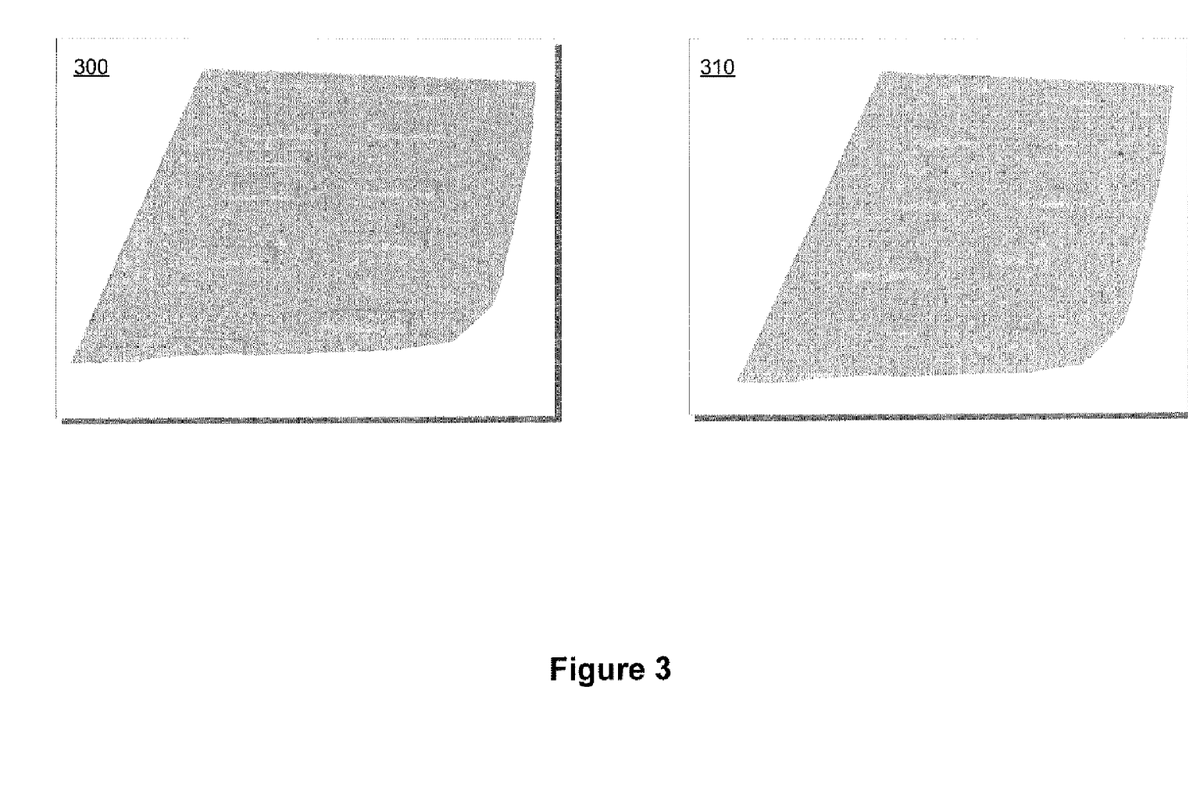
FIG. 3 shows an exemplary representation of a three-dimensional data set of a common field of view.

FIG. 3 shows an exemplary representation of a three-dimensional data set of a common field of view. As shown in FIG. 3, a common field of view may be represented and stored as high resolution dataset 300 and low resolution dataset 310. High resolution dataset 300 may be a stored three-dimensional dataset comprised of an array of spatially-registered enhanced voxels. High resolution dataset 300 may serve as a reference three-dimensional dataset that may be used by processor 108 to perform a real-time comparison with a current three-dimensional dataset. A reference three-dimensional dataset may be derived from imagery associated with a field of view within a geographic region which may be subsequently be used for travel or residence. In some embodiments, high resolution dataset 300 may be captured by imaging receivers 114A and 118B, location tagged with a point of reference, and transformed into an array of spatially-registered enhanced voxels using code executed by processor 108. In other embodiments, high resolution dataset 300 may be generated based on imagery captured from external sources that may be received by system 100 as stereo images or as a three-dimensional data set, such as a wire grid or a depth map. In some embodiments, low resolution dataset 310 may be the current three-dimensional dataset corresponding to one of a plurality of stored three-dimensional views. In some embodiments, low resolution dataset 310 may be generated from imagery captured by imagining receiver A 114 and imaging receiver B 118 operating at a lower image capture resolution than used to capture reference three-dimensional datasets. Low resolution dataset 310 may also be comprised of an array of spatially-registered enhanced voxels. Yet, the array may be less dense or of equal density as compared to an array of a corresponding high resolution dataset 300.

In operation, low resolution dataset 310 may be generated in real-time as a vehicle equipped with system 100 travels along a selected travel route previously imaged and stored as reference three-dimensional datasets in memory, such as memory 108 or secondary storage 112. In some embodiments, the generation of low resolution dataset 310 may be configured to provide sufficient resolution to produce an accurate comparison with high resolution reference dataset 300 for purposes of terrain change detection and vehicle navigation. The resolution setting may be further configured to reduce the demand on storage and computational resources associated with the storing the three-dimensional datasets and performing the image comparisons. For example, the resolution settings associated with low resolution dataset 310 may be configured based on the capacity of memory 106, the architecture of processor 108, the bandwidth of bus 102, or the interconnects between imaging receivers 114A and 118B and pattern projector 116.

Figure 4:
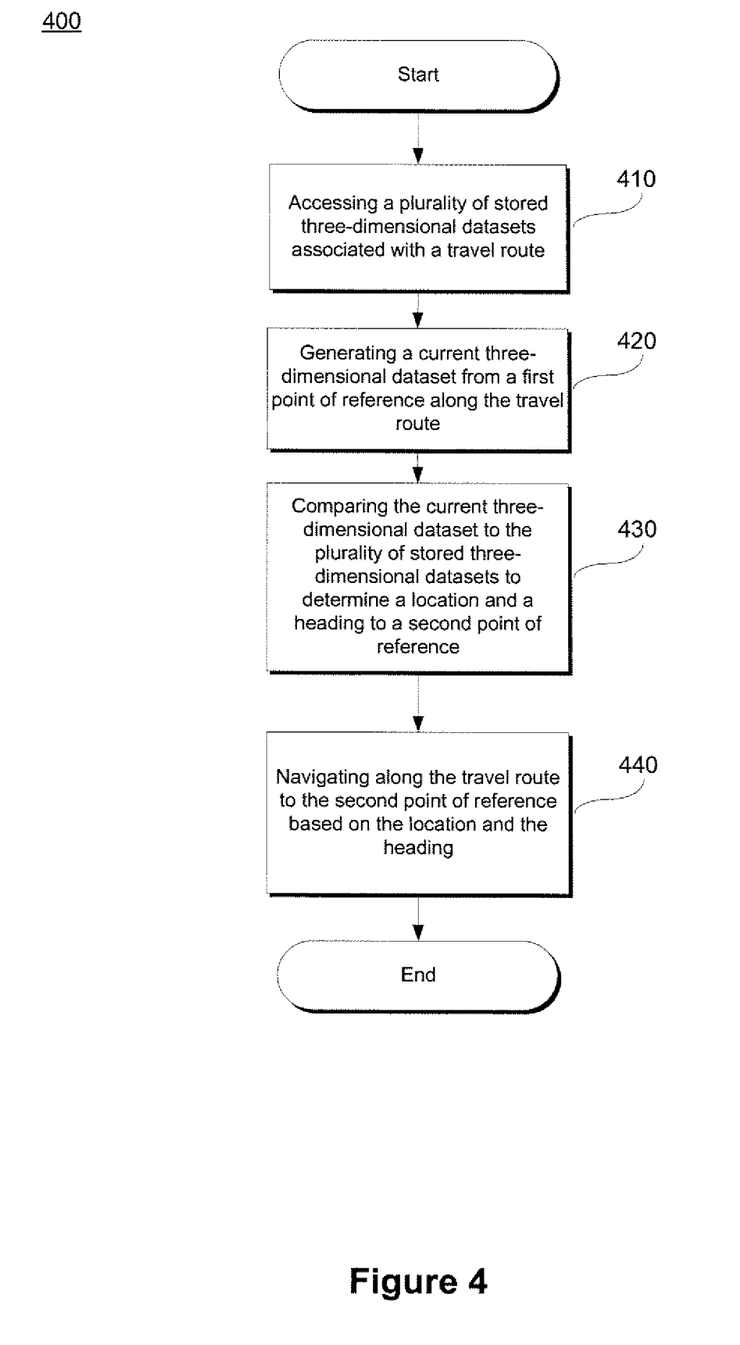
FIG. 4 shows a flowchart illustrating steps in an exemplary method for providing navigation based on real-time projection of a structured light pattern.

FIG. 4 shows a flowchart 400 illustrating steps in an exemplary method for providing navigation based on real-time projection of a structured light pattern. It will be readily appreciated by one having ordinary skill in the art that the illustrated procedure can be altered to delete steps, move steps, or further include additional steps.

In step 410, a plurality of stored three-dimensional datasets are accessed based on the selected travel route. The stored or reference three-dimensional datasets may be downloaded automatically or manually from memory based on the selection of a travel route, landmark, or geographic feature. In some embodiments, the selection may include defining a starting point, a destination point, a heading, and range surrounding the route. For example, a route may be defined by a starting point of 34.946739 latitude, −104.685974 longitude, a destination point of 34.980889 latitude, −105.080152 longitude, with a range of 10 km along the route. In some embodiments, route selection data may be received as text, graphical, audible, or other formats capable of being processed into geo-spatial data. In some embodiments, three-dimensional datasets may be stored in memory coupled to an image capturing device. In other embodiments, reference three-dimensional datasets may be stored in an external location and accessible using a wireless connection. In certain embodiments, reference three-dimensional datasets may be included on a computer-readable storage media, such as a portable memory device.

In operation, a subsection of a larger collection of three-dimensional datasets corresponding to a particular geographic region may be sufficient to perform accurate navigation and location determination along the selected travel route within the particular geographic region. Thus, accessing reference three-dimensional dataset corresponding to the selected route or particular geographic feature may utilize a limited number of stored three-dimensional datasets compared to the total number of stored reference three-dimensional datasets. The reduction in the number of reference three-dimensional datasets transferred and/or used based on the selection of the travel route or a geographic feature, may in some cases, reduce storage and computational resources used to perform navigation and location determination.

In some embodiments, the stored three-dimensional images may be gathered during an initial observation of the particular geographic region. The particular geographic region may be, for example, an area of interest that includes existing or planned travel routes. Reference imagery captured within the area of interest may be tagged with geo-spatial information to associate each captured image with the specific geographic location or point of reference. The point of reference and geo-spatial information may be obtained using geo-positioning techniques, including but not limited to, terrestrial-based or space-based radio navigation systems, such as global positioning system (GPS). The geo-spatial information collected from the point of reference may be associated with such information as the time of collection and the location of the point of reference, and stored. Location information may be provided in several formats, including but not limited to latitude and longitude, azimuth and elevation, altitude, or street address.

In some embodiments, the reference three-dimensional datasets may be collected as high resolution stereo imagery. In some embodiments, the datasets may be single or multi-dimensional datasets comprised of an array of spatially-registered enhanced voxels with geo-spatial data corresponding to the travel route. In some embodiments, high resolution imagery may have sufficiently higher resolution compared to real-time captured imagery based on the desired accuracy of navigation. That is, the reference three-dimensional datasets may be configured to have a resolution sufficient to provide a basis for accurate three-dimensional dataset comparison to perform navigation based on a defined system resolution. For example, the system resolution may be configured to be in the centimeter range. In some embodiments, reference three-dimensional datasets may be generated based on imagery captured from external sources, such as satellite imagery. Imagery provided by external sources may be provided as stereo imagery or as a three-dimensional data set, such as a wire grid or a depth map. Alternatively or additionally, high resolution imagery may also be collected using a pair of imaging devices or a single imaging device. In some embodiments, the imaging device or devices may be configured to generate a stereo image in a similar manner as described in step 420.

In step 420, a current three-dimensional dataset may be generated from a first point of reference along the selected travel route. In some embodiments, a current three-dimensional dataset may be generated using one or a pair of imaging devices configured to produce a stereo image. For example, each imaging device may be configured to capture a right or a left image perspective of the stereo image. In other embodiments, a single imaging device may be positioned at a first position to capture a right image perspective and subsequently moved to a second position to capture the left image perspective. The second position may be chosen to position the single imaging device at a distance from the first position equal to the fixed distance used in applications with two imaging devices.

Complementary left and right image perspectives may be received and processed using a computing device coupled to the imaging devices. Processing may include, transforming the stereo imagery into a single or a multi-dimensional dataset, which may provide a basis for subsequent for navigation or location determination. In some embodiments, processing stereo imagery may be executed in real-time by a processor executing code to transform stereo imagery into a three-dimensional data set. A three-dimensional dataset may be produced by determining range data associated with each point in a captured image. In some embodiments, range information may be calculated using a processor executing code that performs triangulation or other algorithms used to determine range data from one or more captured images. For example, the code used to determine range information by triangulation may utilize the relative position of an imaging device with respect to a projector generating a particular structured light pattern. For example, by positioning an imaging device a fixed distance away from a projector generating the structured light pattern, range or depth information can be calculated based on the return energy from the structure light pattern captured by the imaging device. Here, a structured light pattern may be a single dot or a line comprised of a series of dots. A change in the angle of return of the reflected dot of dots to the imaging device may indicate a deflection of the structured light pattern corresponding to the surface features of the illuminated object. Accordingly, the deflections may be transformed into depth or range measurements used to generate a three-dimensional dataset. In some embodiments, the processor may operate on images stored memory. In other embodiments, the processor may operate on images received from the imaging devices.

In some embodiments, the code used to determine range information from two complementary stereo images may include instructions for improving correspondence between the images. For example, in some cases, the terrain associated with a particular point of reference may lack texture or distinguishing features. The lack of distinguishing features may reduce the ability of common correspondence algorithms to identify corresponding pairs of homologous points within the captured stereo image pair. Accordingly, in some embodiments, a structured light pattern may be projected onto a field of view at the point of reference and captured along with the corresponding stereo images. The structured light pattern may provide an artificial means for an algorithm executed by the processor to identify homologous points on a pair of complementary images. For example, in some embodiments, an algorithm may determine correspondence based on the relationship between the projected structured light pattern and its projection onto a surface captured in each of the respective stereo image perspectives. The algorithm, in particular, may use the dispersion between the projected structured light pattern and the projection of the structured light pattern captured by the imaging devices to calculate depth.

In some embodiments, a structured light pattern may be generated by projecting an optical signal through the diffractive optic element. An optical signal may be generated by, for example, a light source, such as a laser, projecting light in a non-visible spectrum in the direction of a diffractive optic element. The passing of the optical signal through a diffractive optic element creates a structured light pattern. The structured light pattern may have various dimensions and qualities depending, at least in part, on the surface relief profile or refractive index of the optic element or the incident angle between the optical signal and the diffractive optic element.

The strength of the light or the structured light pattern that is used may be based on a number of factors including environmental factors such as weather or light conditions, the distance to the surface of the terrain in the field of view from diffractive optic element, and the structural and geographic features within the field of view. For example, if the light source projecting the light is determined to be far away from the surface of the field of view, the light may be projected at a higher power. If closer, the light may be projected at a lower power.

In some embodiments, the power at which the light is projected may be adjusted manually and, in some cases, it may be adjusted automatically based on detected environmental factors. For example, the environmental factors may be detected by a detector within the light source itself, in another part of the system, or from an external source. In some embodiments, for example, the light source may be adjusted remotely, such as by a wireless signal transmitted from a location other than where the light source is.

In some embodiments, current three-dimensional datasets may be stored at the point of reference on, for example, a memory co-located with the point of reference, either in the collection device or in a device operatively connected to the collection device. Alternatively, the collected data may be stored in memory accessible through wireless communications by the data collection device at the point of reference. The collected data can then be compared and/or correlated with reference three-dimensional datasets and features obtained during a previous observation of the area.

In step 430, a current three-dimensional dataset associated with a point of reference may be compared to reference three-dimensional datasets to determine a location and a heading to a second point of reference along the travel route. For example, in some embodiments, depth maps of high resolution reference three-dimensional datasets may be compared with a depth map of a lower resolution current three-dimensional dataset, as shown in FIG. 3. In some embodiments, the comparison may be performed on a processor executing code adapted to compare three-dimensional datasets. In some embodiments, the comparison may analyze one or several aspects of the reference three-dimensional dataset and the current three-dimensional dataset. For example, a comparison may analyze and compare the similarities of particular features from a current three-dimensional dataset with the reference three-dimensional datasets associated with the selected travel route. Similarities may indicate a current three-dimensional dataset corresponds to a reference three-dimensional dataset, associated with a known location. The known location may be determined based on geo-spatial data associated with the reference three-dimensional dataset. Thus, using the location information associated with the corresponding reference three-dimensional dataset, the location associated with the current three-dimensional dataset may be determined. Heading information may be determined by using the location information of the current three-dimensional dataset as a reference point and directional information based on the selected travel route.

Using three-dimensional dataset comparisons, such as depth map or wire frame comparisons, instead of visual cues to identify objects and potential hazards, may mitigate the problems associated with color, shadowing, lighting, resolution and platform movement variables. Further, comparing a lower resolution current three-dimensional dataset to a higher resolution reference three-dimensional dataset may reduce computational complexity, and thus reduce processing demands and memory resources. For example, in some embodiments, computational resources may be reduced by setting the higher resolution reference three-dimensional dataset to twice the resolution of the lower resolution current three-dimensional dataset.

In step 440, navigating along the selected travel route to the second point of reference based on a heading and a location may be performed. For example, the location information resulting from step 430 may provide a reference point along the selected travel route. A second point of reference along the travel route may be reached by using the heading data as a vector that directs that an operator to stay on the travel route. In some embodiments, code may be executed to continuously determine and to display the second point of reference based on location and heading information calculated in step 430. In some embodiments, one or a combination of hardware, firmware, and software may be used to render the current three-dimensional dataset and the corresponding reference three-dimensional dataset stereographically at any time of day. In other words, the current three-dimensional dataset may be displayed as a daytime view while a vehicle is traveling along the selected travel route when visibility may be impaired, such as at night or in adverse weather.

Figure 5:
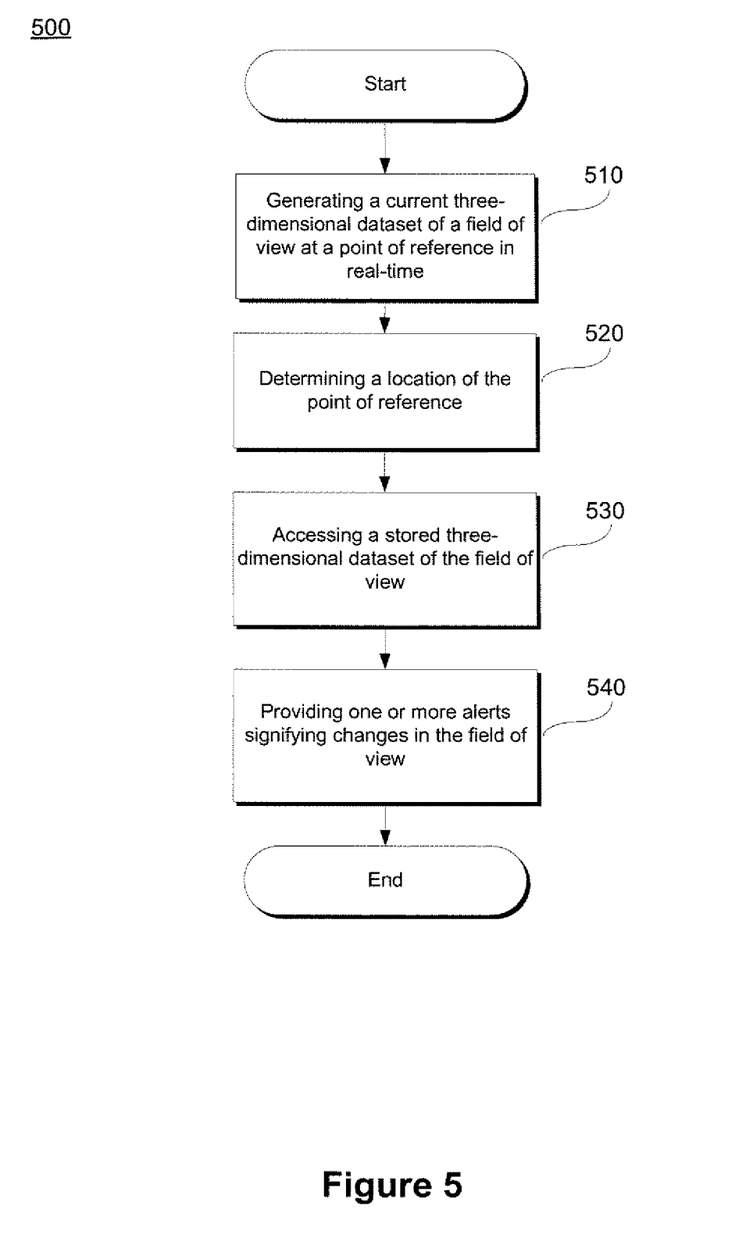
FIG. 5 shows a flowchart illustrating steps in an exemplary method for providing terrain change detection based on real-time projection of a structured light pattern.

FIG. 5 shows a flowchart 500 illustrating steps in an exemplary method for providing terrain change detection based on real-time projection of a structured light pattern. It will be readily appreciated by one having ordinary skill in the art that the illustrated procedure can be altered to delete steps, move steps, or further include additional steps. Step 510 includes elements similar to those described in step 420.

In step 520, a location associated with the point of reference may be determined. In some embodiments, the location associated with the point of reference may be obtained using geo-positioning techniques, including but not limited to, terrestrial-based or space-based radio navigation systems, such as GPS. The geo-spatial information collected from the point of reference may be associated with such information as the time of collection and the location of the point of reference, and stored. Location information may be provided in several formats, including but not limited to one or a combination of latitude and longitude, azimuth and elevation, altitude, or street address.

In step 530, a stored three-dimensional dataset generated from data previously captured at the point of reference is accessed. Previously stored imagery, such as a three-dimensional reference model, of the location associated with the point of reference may be accessed based on a determination of the location of the point of reference performed in step 520. That is, once a location of the point of reference is determined, previously captured imagery associated with the selected geographic region may be searched for a previously captured view of the same location. In some embodiments, a plurality stored three-dimensional datasets may be accessed based on selecting a geographic region, a landmark, or a geographic feature that has been previously surveyed. For example, the geographic region may be a selected travel route as described in step 410, an urban center, or other region. In a similar manner as described in step 410, stored or reference three-dimensional datasets may be downloaded automatically or manually from memory based on the selection of the particular geographic region. In some embodiments, the selection may be made by entering boundaries defined by latitude an longitude or by selecting a region with an input device, such as a stylus, using a graphical user interface. In some embodiments, the selection may be made using a voice prompt. In some embodiments, reference three-dimensional datasets may be stored in memory coupled to an image capturing device. In other embodiments, reference three-dimensional datasets may be stored in a external location and accessible using a wireless connection. In certain embodiments, reference three-dimensional datasets may be included on a computer-readable storage media, such as a portable memory device.

In operation, a subsection of a larger collection of stored three-dimensional datasets may be sufficient to perform accurate terrain detection for a particular geographic region Thus, accessing reference or stored three-dimensional datasets corresponding to the selected geographic region may utilize a limited number of datasets compared to the total number of stored reference three-dimensional datasets. For example, a user may download or access a limited number of stored three-dimensional datasets based on the planned search of a particular geographic region. The reduction in the number of stored three-dimensional datasets transferred and/or used based on the selection of a geographic region, may in some cases, reduce storage and computational resources used to perform terrain change detection within the selected geographic region.

In some embodiments, the stored three-dimensional datasets may be gathered during an initial observation of the particular geographic region. The stored three-dimensional datasets captured within the geographic region may be stored as an array of spatially-registered voxels tagged with geo-spatial information to associate each data point within each captured dataset with a location or point of reference within the geographic region. The point of reference and geo-spatial information may be obtained using geo-positioning techniques, including but not limited to, terrestrial-based or space-based radio navigation systems, such as global positioning system (GPS). The geo-spatial information collected from the point of reference may be associated with such information as the time of collection and the location of the point of reference, and stored. Location information may be provided in several formats, including but not limited to latitude and longitude, azimuth and elevation, altitude, or street address. In some embodiments, the reference three-dimensional dataset may be collected as high resolution stereo imagery, as previously described in step 420.

In step 540, one or more alerts signifying changes between the current three-dimensional dataset of the field of view and the stored three-dimensional dataset of the field of view may be provided. Data, represented as a current three-dimensional dataset, may be compared and/or correlated in real-time with depth maps and features obtained during a previous observation of a geographic region. In some embodiments, a current three-dimensional dataset associated with a point of reference may be compared to reference three-dimensional datasets accessed based on the selection of the geographic region. For example, in some embodiments, depth maps of high resolution reference three-dimensional datasets may be compared with a depth map of a lower resolution current three-dimensional dataset of the same point of reference captured at different times. In some embodiments, the comparison may be performed on a processor executing code adapted to compare three-dimensional datasets. In some embodiments, the comparison may analyze one or several aspects of both datasets to detect changes based on a differential threshold associated with one or many points within the datasets. In other embodiments, the comparison may analyze both datasets based on a pre-determined set of features of interest, such as disturbed earth along a roadside.

In some embodiments, both the stored three-dimensional dataset and the current three-dimensional dataset associated with a particular point of reference may be displayed to a user. In other embodiments, the current three-dimensional dataset may be displayed with some indication of changes between the stored three-dimensional dataset and current three-dimensional dataset. For example, a new surface or object in the current three-dimensional dataset may be displayed with an alert or an indicator, such as a circle around it to indicate to the viewer that this surface or object was not present or has been changed from the prior time.

In some embodiments, an alert or a notification may include other visual indicators, such as an electronic message, text, or graphic, or any other humanly perceivable visual indicator. Alternatively or additionally, an alert may be for example, an audible indicator, such as a single tone, a multi-tone, speech, or other any other humanly perceivable audible signal.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for detecting a change in a field of view from a first point in time to a second point in time, the method comprising:
   receiving, at a mobile unit in real time, current imaging data at a first point of reference on a travel route from a stereo pair of imaging receivers mounted on the mobile unit traveling along the travel route;
   generating, by the processor of the mobile unit in real time, a current three-dimensional dataset of the field of view from the first point of reference based on the current imaging data;
   determining a location of the first point of reference based on geo-spatial data;
   accessing a stored three-dimensional dataset of the field of view at the mobile unit, wherein the stored three-dimensional dataset is generated from imaging data previously captured at a second point of reference, and wherein the current three-dimensional dataset has a resolution lower than the resolution of the stored three-dimensional dataset;
   comparing, by the processor of the mobile unit, the current three-dimensional dataset of the field of view to the stored three-dimensional dataset of the field of view;
   identifying, by the processor of the mobile unit, the change in the field of view based on the comparison; and
   providing one or more alerts signifying the change in the field of view between the current three-dimensional dataset and the stored three-dimensional dataset.

2. The method of claim 1, wherein generating the current three-dimensional dataset of the field of view comprises:
   generating a structured light pattern;
   projecting the structured light pattern from the first point of reference onto the field of view;
   receiving a stereo image of the field of view and the structured light pattern; and
   transforming, in real-time, the stereo image into a three-dimensional dataset based in part on the structured light pattern.

3. The method of claim 2, wherein generating the structured light pattern comprises transmitting an optical signal through a diffractive optic element, wherein the optical signal is one of a time sequential, a continuous wave, or a pulsed signal.

4. The method of claim 2, wherein the structured light pattern comprises one of a dot, a single line comprised of multiple dots, a dot-array, multiple parallel lines, or multiple orthogonally intersecting lines.

5. The method of claim 2, wherein receiving the stereo image of the field of view comprises:
   capturing a first image perspective of the field of view, wherein the first image perspective is either a right or a left image perspective; and
   capturing, simultaneously, a second image perspective of the field of view, wherein the second image perspective is different from the first image perspective.

6. The method of claim 1, wherein the current three-dimensional dataset and the stored three-dimensional dataset of the field of view is one of a wire grid, a depth map, or a point cloud.

7. The method of claim 1, wherein the geo-spatial data is received from a satellite.

8. The method of claim 1, wherein accessing the stored three-dimensional dataset comprises retrieving a plurality of stored three-dimensional datasets, wherein the plurality of stored three-dimensional datasets is selected based on a selection of the travel route or selected objects along the travel route.

9. The method of claim 1, further comprising displaying the change in the field of view.

10. The method of claim 9, wherein displaying the change in the field of view comprises highlighting differences between the current three-dimensional dataset of the field of view and the stored three-dimensional dataset of the field of view on a display showing the current three-dimensional dataset or the stored three-dimensional dataset.

11. The method of claim 1, wherein the one or more alerts signifying the change in the field of view comprises one of an electronic message, text, graphic, a single tone, a multi-tone, or speech.

12. The method of claim 1, wherein the second point of reference differs from the first point of reference.

13. A non-transitory computer-readable storage medium storing instructions that, when executed by a processor, cause the processor to perform a method for detecting a change in a field of view from a first point in time to a second point in time, the method steps comprising:
   receiving, at a mobile unit in real time, current imaging data at a first point of reference on a travel route from a stereo pair of imaging receivers mounted on the mobile unit traveling along the travel route;
   generating, by the processor of the mobile unit in real time, a current three-dimensional dataset of the field of view from the first point of reference based on the imaging data;
   determining a location of the first point of reference based on geo-spatial data;
   accessing a stored three-dimensional dataset of the field of view at the mobile unit, wherein the stored three-dimensional dataset is generated from imaging data previously captured at a second point of reference, and wherein the current three-dimensional dataset has a resolution lower than the resolution of the stored three-dimensional dataset;

comparing, by the processor of the mobile unit, the current three-dimensional dataset of the field of view to the stored three-dimensional dataset of the field of view;

identifying, by the processor of the mobile unit, the change in the field of view based on the comparison; and providing one or more alerts signifying a change in the field of view between the current three-dimensional dataset of the field of view and the stored three-dimensional dataset of the field of view.

14. The computer-readable storage medium of claim 13, wherein generating the current three-dimensional dataset of the field of view comprises:

generating a structured light pattern;

projecting the structured light pattern from the first point of reference onto the field of view;

receiving a stereo image of the field of view and the structured light pattern; and transforming, in real-time, the stereo image into a three-dimensional dataset based in part on the structured light pattern.

15. The non-transitory computer-readable storage medium of claim 13, wherein the second point of reference differs from the first point of reference.

* * * * *